C. H. ALLEN.
SYSTEM OF MOTOR CONTROL.
APPLICATION FILED APR. 1, 1918.
1,401,387.
Patented Dec. 27, 1921.
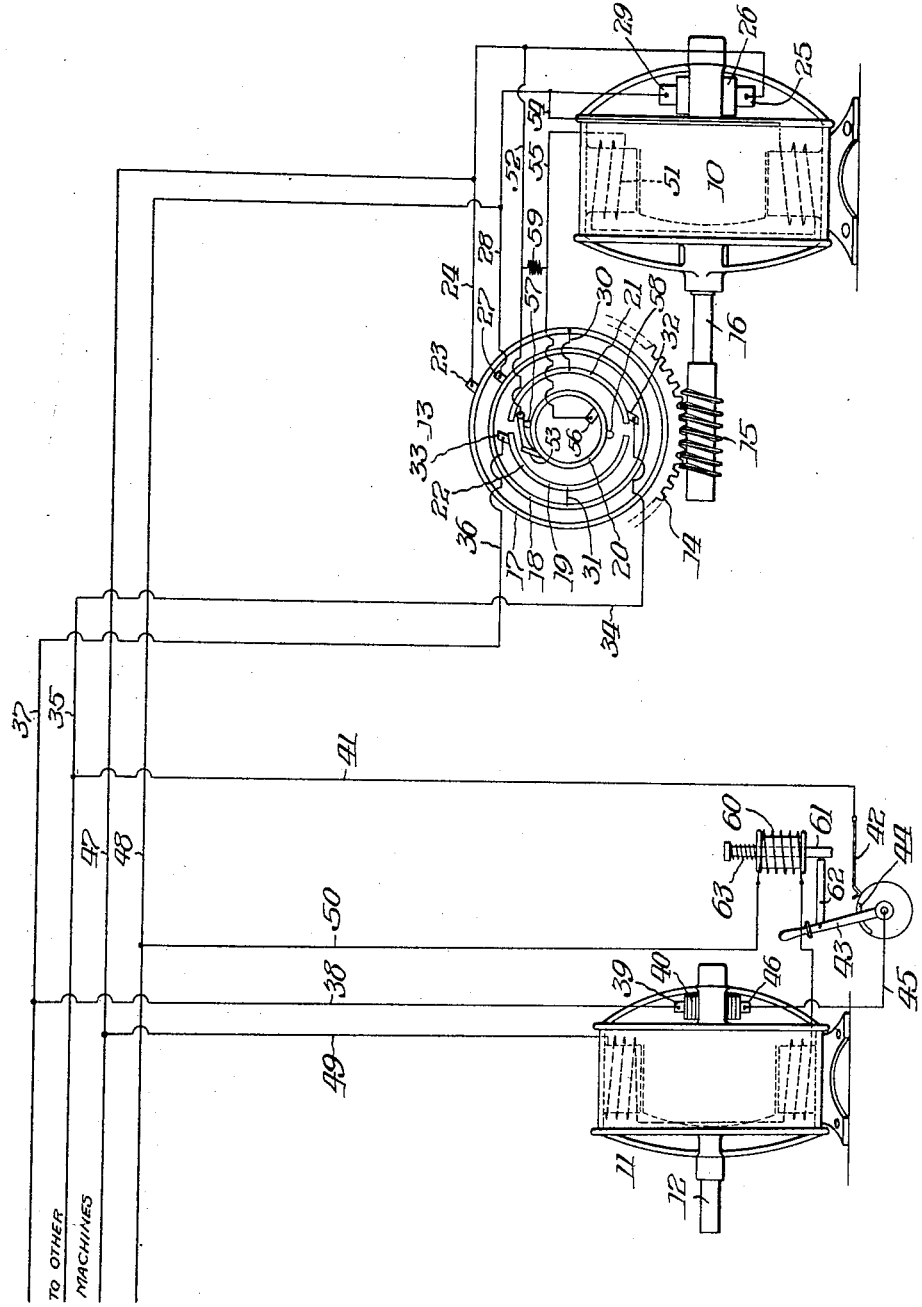
WITNESSES:
INVENTOR.
Charles H. Allen
BY Wilkinson & Huxley
ATTORNEYS.

UNITED STATES PATENT OFFICE.

CHARLES H. ALLEN, OF CHICAGO, ILLINOIS, ASSIGNOR TO TROY LAUNDRY MACHINERY COMPANY, LTD., OF CHICAGO, ILLINOIS, A CORPORATION OF NEW YORK.

SYSTEM OF MOTOR CONTROL.

1,401,387.      Specification of Letters Patent.      Patented Dec. 27, 1921.

Application filed April 1, 1918. Serial No. 225,377.

*To all whom it may concern:*

Be it known that I, CHARLES H. ALLEN, a citizen of the United States, and resident of Chicago, in the county of Cook and State of Illinois, have invented certain new and useful Improvements in Systems of Motor Control, of which the following is a specification.

This invention relates to systems of motor control.

In washing machines of certain types, for example, the cylinder type, the washer cylinder is rotated a certain amount in one direction and then reversed to rotate in an opposite direction. It is a good present-day practice to drive the washer cylinders by electric motors, one for each machine. In order to change the direction of rotation of the washer cylinders some control means must be provided.

Accordingly, one object of my invention is to improve the means for controlling motors for reversing and driving the washer cylinders of washing machines in different directions.

Another object is to provide a system of motor control for washing machines adapted to meet the requirements for successful operation.

Generally speaking, these and other objects are accomplished by providing, in a system of motor control, a motor, a generator for supplying current to said motor, and a novel controller arrangement including a controller driven by said generator for reversing the flow of current supplied to said motor.

The invention is illustrated on the accompanying sheet of drawings, which shows somewhat diagrammatically my system of motor control.

Referring to the drawing, it will be noted that I have shown a direct current shunt wound generator 10 and a motor 11, preferably an interpole shunt wound machine, it being understood that there may be any number of motors, one for each particular washing machine to be driven. It also will be understood that the motor shaft 12 of each motor will be connected to its corresponding washer cylinder or other member to be driven. A controller 13 is shown as having a worm gear 14 which meshes with and is driven by a worm 15 mounted upon the shaft 16 of the generator 10.

This controller 13 includes four slip rings, 17, 18, 19 and 20, all of which are positively actuated at all times in the same direction through its gearings with the generator, which latter is also driven continuously in a given direction. The two outer rings 17 and 18 and the inner ring 20, are continuous. The function of the outer ring 17 is to form a current-carrying connection for the segment 21 of ring 19, and the function of the continuous ring 18 is to form a current-carrying connection for the other segment 22 of the segmental ring 19. Bearing upon the slip ring 17 is a brush 23 electrically connected to a conductor 24, which is connected to a brush 25 in contact with the generator armature 26. Engaging slip ring 18 is brush 27 electrically connected to a conductor 28 connected to a brush 29 also bearing upon the generator armature 26. Ring 17 and sector 21 are electrically connected by a conductor 30, and ring 18 is connected to other segment 22 by a conductor 31. Adapted to consecutively engage the contact segments 21 and 22 are two brushes 32 and 33, the former being electrically connected to a conductor 34 connected to a motor current supply line 35. Electrically connected to the brush 33 is a conductor 36 which is connected to another motor current supply line 37. Leading from current supply line 37 is a conductor 38 connected to brush 39 in contact with the motor armature 40. A conductor 41 connected to supply line 35 is electrically connected to a contact 42 of a hand operated switch 43, the other contact 44 of the switch being electrically connected to a conductor 45 connected to a brush 46 bearing upon the motor armature 40. Motor field supply lines 47 and 48 are respectively connected to conductors 24 and 28, whereby the motor field winding of each motor is connected in shunt with its armature winding through conductors 49 and 50, respectively connected to lines 47 and 48. The generator field circuit 51, which is connected in shunt to the generator armature circuit, is connected to the inner continuous slip ring 20 by a conductor 52 connected to conductor 24 and to a brush 53 electrically associated with the slip ring 20 and by a conductor 54 which connects one end of the field winding 51 with conductor 28, the other end of the field winding 51 being connected to a conductor 55 leading to brush 56 in engagement with the inner slip ring 20. In other words, the generator field winding 51 is in series with the inner slip ring 20. The inner slip ring is provided with two diametrically opposite insulated projections 57 and 58, the function of which projections is to raise the brush 53 out of engagement with the ring 20, or, in other words, to, in effect, substantially break the generator field circuit just prior to the time that the current supply to the motors is reversed, contact between the brush 53 and the slip ring 20 being restored immediately thereafter. To avoid arcing, a suitable coil 59 is connected across the conductors 52 and 55, this coil having a sufficiently high resistance so that no effective current passes through the generator armature when the shunt through the ring 20 is broken, the shunt comprising the effective circuit.

Connected in series with the motor field circuit is a solenoid coil 60, which, when the motor field circuit is energized, draws the plunger 61 downwardly into the path of movement of a projection or arm 62 on the handle of the motor switch 43 to prevent the motor being drawn onto the line when the voltage is above a certain predetermined value. However, the switch 43 can be thrown into position for starting the motor when the voltage is not sufficiently high to overcome the spring 63, the function of which is to raise and hold the plunger 61 in its elevated position.

It will be understood that this direct current generator 10 continuously drives the controller in the same direction at the proper speed, determined by the gearing ratio. With the parts arranged as shown in the drawings, current is supplied from the generator armature through conductor 24 to outer ring 17 to conductor 30, to contact segment 21 which, as shown, is engaged by brush 32 connected to conductor 34, which in turn is connected to line 35 from which current passes through conductor 41, switch contacts 42 and 44, if the switch is closed, through conductor 45, motor armature 40, conductor 38 to line 37, conductor 36, contact segment 22, conductor 31, slip ring 18, brush 27, conductor 28, back to the generator armature 26, for driving the motor, or motors, in a given direction. After the washer cylinders or other members driven by the motors are rotated a certain predetermined amount, the same are reversed in their direction of movement when the controller is rotated to the extent that the contact sector 21 is moved out of engagement with brush 32 and contact segment 22 moved out of engagement with said brush 33, and contact segment 22 moved into engagement with said brush 32 and contact segment 21 moved into engagement with said brush 33. The current supplied to the armatures of the motors, therefore, is reversed for driving the motors in an opposite direction. Just before the brushes 32 and 33 pass out of engagement with their respective segments, the brush 53 is raised out of electrical engagement with the inner controller slip ring 20 for breaking the shunt which is part of the effective generator field circuit, and as soon as these brushes 32 and 33, respectively, move into engagement with said contact segments in a different relationship for making connections with the motor armature circuit, the brush 53 is permitted to move back into engagement with the controller slip ring 20.

By means of this system of motor control, reversing is easily made, there being no arcing at the contacts, as there are no circuits opened automatically when the current is flowing. It permits the machines to be reversed, at the same time allowing ample time for coasting of the washer cylinder and absorbing of shock to gearing and mechanical parts. The maintenance cost is low, efficiency high, and there are no excessive peak loads to create line disturbances.

I claim:

1. In a system of motor control, a motor having an armature winding, a generator for supplying current to said motor, said generator having a field winding, and a controller for reversing the current supplied to the motor armature winding, the controller being further adapted to momentarily reduce the excitation of the generator said reduction of excitation covering the period of the reversal of the motor armature current.

2. In a system of motor control, a motor having an armature winding, a generator for supplying current to said motor, said generator having a field winding, and a controller for reversing the current supplied to the motor armature winding, said controller causing a period of no current flow to the armature during the reversal, the controller being further adapted to momentarily reduce the excitation of the generator at the time of the reversal of the motor armature current, said reduction of excitation being of greater duration than the period of no current flow to the motor armature.

3. In a system of motor control, a motor having an armature winding, a generator for supplying current to said motor, said generator having a field winding, and a controller for reversing the current supplied to the motor armature winding, said controller comprising a pair of slip rings and a segmental slip ring, one segment of which is electrically connected to each slip ring, the ring and segments being interposed in the circuit between the generator and the motor armature, and adapted to reverse said current, the controller further including a slip ring and brushes in the generator field circuit, and means to momentarily lift a brush to reduce the current in said circuit.

4. In a system of motor control, a motor having an armature winding, a generator for supplying current to said motor, said generator having a field winding, and a controller for reversing the current supplied to the motor armature winding, said controller comprising a pair of slip rings and a segmental slip ring, one segment of which is electrically connected to each slip ring, the ring and segments being interposed in the circuit between the generator and the motor armature, and adapted to reverse said current, there being a gap between the segments whereby there is a period of no current flow to the armature during the reversal, the controller further including a slip ring and brushes in the generator field circuit, and means to momentarily lift a brush to reduce the current in said circuit, said means being so located as to cause the reduction of excitation to occur at the time of the motor armature current reversal and to be of greater duration than the period of no current flow to the armature.

Signed at Chicago, Ill. this 25th day of March, 1918.

CHARLES H. ALLEN.

Witnesses:
C. M. OBERBECK,
CHAS. L. BYRON.